United States Patent
Huang et al.

(10) Patent No.: US 8,000,388 B2
(45) Date of Patent: Aug. 16, 2011

(54) PARALLEL PROCESSING APPARATUS FOR VIDEO COMPRESSION

(75) Inventors: Jonathan JiannJang Huang, Cupertino, CA (US); Tsaifa Yu, Milpitas, CA (US); Kuei-Chung (Larry) Tu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 64 days.

(21) Appl. No.: 11/716,197

(22) Filed: Mar. 8, 2007

(65) Prior Publication Data

US 2008/0219349 A1    Sep. 11, 2008

(51) Int. Cl.
 *H04N 7/12* (2006.01)
(52) U.S. Cl. ............... 375/240.03; 375/240.1
(58) Field of Classification Search ............. 375/240.03, 375/240.1
See application file for complete search history.

(56) References Cited

U.S. PATENT DOCUMENTS

| | | | |
|---|---|---|---|
| 5,138,447 A * | 8/1992 | Shen et al. | 375/240.12 |
| 5,379,070 A * | 1/1995 | Retter et al. | 375/240.2 |
| 6,081,622 A * | 6/2000 | Carr et al. | 382/236 |
| 6,330,370 B2 * | 12/2001 | Goyal et al. | 382/251 |
| 6,775,417 B2 * | 8/2004 | Hong et al. | 382/253 |
| 6,888,891 B2 * | 5/2005 | Lee et al. | 375/240.19 |
| 6,931,061 B2 | 8/2005 | Youn et al. | 375/240.03 |
| 7,190,840 B2 * | 3/2007 | Said | 382/248 |
| 2004/0258162 A1 * | 12/2004 | Gordon et al. | 375/240.25 |

FOREIGN PATENT DOCUMENTS

WO    WO 2004/100557 A2    11/2004

OTHER PUBLICATIONS

Kolinummi et al. Scalable implementation of H.263 Video Encoder on a Parallel DSP System, IEEE International Symposium on Circuits ans Systems, May 28-31, 2000, pp. I-551-I-554.*
"Draft of Version 4 of H.264/AVC (ITU-T Recommendation H.264 and ISO/IEC 14496-10 (MPEG-4 part 10) Advanced Video Coding)" Joint Video Team (JVT) of ISO/IEC MPEG & ITU-T VCEG (ISO/IEC JTCI/SC29/WGll and ITU-SC16 Q.6) 14$^{th}$ Meeting: Hong Kong, CH 18-21 Jan. 2005.

* cited by examiner

*Primary Examiner* — David Czekaj
*Assistant Examiner* — Anner Holder
(74) *Attorney, Agent, or Firm* — Haverstock & Owens LLP

(57) ABSTRACT

A method of and an apparatus for parallel processing video compression is described herein. A picture is divided into N zones vertically, and Vertical Split Parallelism (VSP) deploys N+1 processes: N M-coding processes for general macroblock coding in N zones and one E-coding process for entropy coding. By dividing a macroblock encoding process into M-coding and E-coding processes, multiple M-coding threads and one E-coding thread are able to progress simultaneously with proper synchronization between threads. Since the workload of M-coding processes is greater than E-coding for each macroblock coding process, two cores are able to be designated to the two M-coding processes. Either of the cores are able to be designated to the E-coding process since the workload of E-coding is light. Therefore, VSP utilizes parallel processing computing power efficiently.

15 Claims, 5 Drawing Sheets

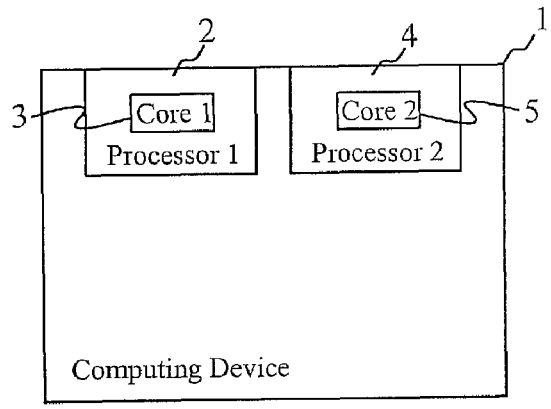
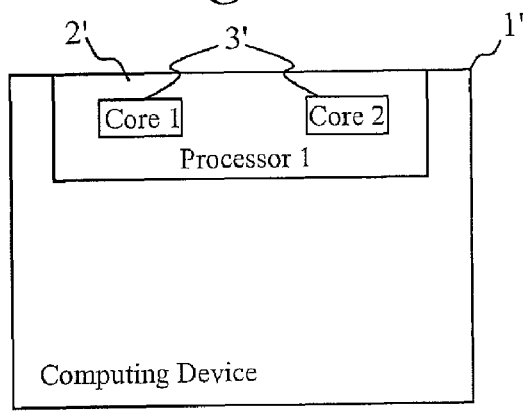
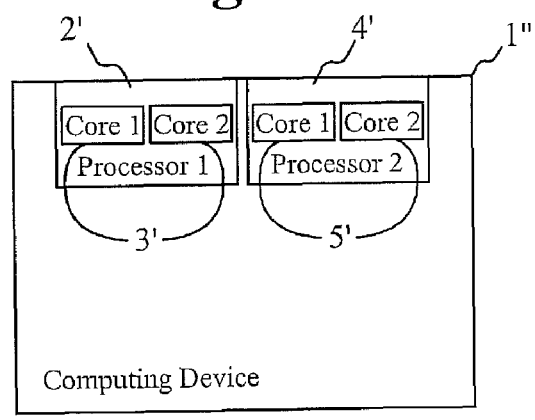

Fig. 3

| 0a<br>e00 | 0a<br>e01 | 0a<br>e02 | 0a<br>e03 | 1b<br>e04 | 1b<br>e05 | 1b<br>e06 | 1b<br>e07 |
|---|---|---|---|---|---|---|---|
| 1a<br>e08 | 1a<br>e09 | 1a<br>e10 | 1a<br>e11 | 2b<br>e12 | 2b<br>e13 | 2b<br>e14 | 2b<br>e15 |
| 2a<br>e16 | 2a<br>e17 | 2a<br>e18 | 2a<br>e19 | 3b<br>e20 | 3b<br>e21 | 3b<br>e22 | 3b<br>e23 |
| 3a<br>e24 | 3a<br>e25 | 3a<br>e26 | 3a<br>e27 | 4b<br>e28 | 4b<br>e29 | 4b<br>e30 | 4b<br>e31 |
| 4a<br>e32 | 4a<br>e33 | 4a<br>e34 | 4a<br>e35 | 5b<br>e36 | 5b<br>e37 | 5b<br>e38 | 5b<br>e39 |
| 5a<br>e40 | 5a<br>e41 | 5a<br>e42 | 5a<br>e43 | 6b<br>e44 | 6b<br>e45 | 6b<br>e46 | 6b<br>e47 |

PARALLEL PROCESSING APPARATUS FOR VIDEO COMPRESSION

RELATED APPLICATION(S)

This Patent Application claims priority under 35 U.S.C. §119(e) of the U.S. Provisional Patent Application Ser. No. 60/831,614, filed Jul. 17, 2006, and entitled "Parallel Processing Apparatus of Video Compression." The Provisional Patent Application Ser. No. 60/831,614, filed Jul. 17, 2006 and entitled "Parallel Processing Apparatus of Video Compression" is also hereby incorporated by reference in its entirety.

FIELD OF THE INVENTION

The present invention relates to the field of video compression. More specifically, the present invention relates to video compression utilizing parallel processors.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability over a simple subtraction. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part 10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16 pixels×16 pixels and as small as 4 pixels×4 pixels, six-tap filtering for derivation of half-pel luma sample predictions, macroblock pair structure, quarter-pixel precision for motion compensation, weighted prediction, an in-loop deblocking filter, an exact-match integer 4 pixel×4 pixel spatial block transform, a secondary Hadamard transform performed on "DC" coefficients of the primary spatial transform wherein the Hadamard transform is similar to a fast Fourier transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bit-stream made up of a series of three types of encoded data frames. The three types of data frames are an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for both temporal redundancy and spatial redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frame or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

One of the most time-consuming components within the encoding process is motion estimation. Motion estimation is utilized to reduce the bit rate of video signals by implementing motion compensated prediction in combination with transform coding of the prediction error. Motion estimation-related aliasing is not able to be avoided by using inter-pixel motion estimation, and the aliasing deteriorates the prediction efficiency. In order to solve the deterioration problem, half-pixel interpolation and quarter-pixel interpolation are adapted for reducing the impact of aliasing. To estimate a motion vector with quarter-pixel accuracy, a three step search is generally used. In the first step, motion estimation is applied within a specified search range to each integer pixel to find the best match. Then, in the second step, eight half-pixel points around the selected integer-pixel motion vector are examined to find the best half-pixel matching point. Finally, in the third step, eight quarter-pixel points around the selected half-pixel motion vector are examined, and the best matching point is selected as the final motion vector. Considering the complexity of the motion estimation, the integer-pixel motion estimation takes a major portion of motion estimation if a full-search is used for integer-pixel motion estimation. However, if a fast integer motion estimation algorithm is utilized, an integer-pixel motion vector is able to be found by examining less than ten search points. As a consequence, the computation complexity of searching the half-pixel motion vector and quarter-pixel motion vector becomes dominant.

Due to the advance of semiconductor technology that reduces the size of a transistor continuously so that it increases the silicon space for implementing more functionality, and the physical limitations that cause significant heat dissipation, processor manufacturers have started to introduce multi-core or multi-processor systems. Video compression processing demands processor power and attempts to exploit the computational power that contemporary processors are able to provide. However, many video compression methodologies are either sequentially-defined or there exists dependence between neighborhood video objects so that it is difficult to exploit the thread level parallelism for video compression processes on contemporary parallel computing systems. One of the approaches to exploit the parallel processing power in video compression applications is to split a picture in video sequence to multiple parts horizontally, known as slices. Since there is no semantical dependency between slices of multi-slice, this is suitable for video compression in multi-processing systems.

However, some video compression applications require a single slice approach (one slice per picture). With the single slice approach, there are many dependency issues in single slice syntax and semantics around block boundary, especially in the Advanced Video Coding (AVC) specification.

One method of parallel processing video compression on a multi-processing system with the single slice approach is to divide a picture horizontally to top half and bottom half. One thread processes the top half of the picture and the other thread processes the bottom half. Both threads process the same picture. The bottom thread ignores dependency around the boundary and also handles conformance of syntax around the boundary. When the bottom thread processes the first Macroblock (MB) lines, it selects the MB mode that is independent of its upper MB. However, this kind of general methodology causes worse efficiency of compression than the standard single slice raster scan approach.

Another parallel processing methodology of video compression is to split a picture into multiple parts horizontally. These horizontally separated parts are called slices. The video compression system then encodes these slices in a parallel processing way. This method produces a multiple slice result.

However, the multiple slice approach suffers many problems. The encoded result of multiple slices is different from single slice because the encoded result of multiple slices is semantically independent of each other. Therefore, it is difficult or impossible to validate the correctness of parallel processing methodology by multi-slices. The video quality decreases at the boundaries of slices. Video compression using horizontal multi-slices encoding suffers workload unbalance if the complexity of video contents are different in different slices. The result of individual slices of horizontal multi-slices encoding needs to be concatenated to form a single result. This is additional work that does not exist in single slice encoding.

SUMMARY OF THE INVENTION

A method of and an apparatus for parallel processing video compression is described herein. A picture is divided into N zones vertically, and Vertical Split Parallelism (VSP) deploys N+1 processes: N M-coding processes for general macroblock coding in N zones and one E-coding process for entropy coding. By dividing a macroblock encoding process into M-coding and E-coding processes, multiple M-coding threads and one E-coding thread are able to progress simultaneously with proper synchronization between threads. Since the workload of M-coding processes is greater than E-coding for each macroblock coding process, two cores are able to be designated to the two M-coding processes. Either of the cores are able to be designated to the E-coding process since the workload of E-coding is light. Therefore, VSP utilizes parallel processing computing power efficiently.

In one aspect, an apparatus for compressing video comprises a plurality of processing cores and a program for implementing the plurality of processing cores to process N M-coding processes and an E-coding process. N equals the number of processing cores within the plurality of processing cores. The E-coding process is processed by an available processing core selected from the plurality of processing cores. The available processing core is selected automatically. The N M-coding processes include mode decision, transformation and quantization and the E-coding process includes entropy coding. The N M-coding processes are processed in parallel. The N M-coding processes are processed simultaneously. The N M-coding processes each correspond to a vertical zone. The N M-coding processes each correspond to a split-shifted vertical zone. The N M-coding processes each correspond to a diagonal zone. The plurality of processing cores are for: M-coding a current macroblock after M-coding a previous macroblock finishes, E-coding the current macroblock after M-coding the current macroblock finishes and E-coding the current macroblock after E-coding the previous macroblock finishes. The plurality of processing cores are for M-coding a macroblock after E-coding of an upper-right macroblock finishes if the macroblock is not in a first macroblock row. The plurality of processing cores are for M-coding a macroblock after E-coding of an upper macroblock finishes if the macroblock is a last macroblock in a macroblock row.

In another aspect, an apparatus for compressing video comprises a first processing core for processing a first M-coding thread and a second processing core coupled to the first processing core for processing a second M-coding thread, wherein an E-coding thread is processed by an available processing core selected from the first processing core and the second processing core. The first and second M-coding threads include mode decision, transformation and quantization and the E-coding thread includes entropy coding. The available processing core is selected automatically. The first M-coding thread and the second M-coding thread are processed in parallel. The first M-coding thread and the second M-coding thread are processed simultaneously. The first M-coding thread corresponds to a first vertical zone and the second M-coding thread corresponds to a second vertical zone. The first M-coding thread corresponds to a first split-shifted vertical zone and the second M-coding thread corresponds to a second split-shifted vertical zone. The first M-coding thread corresponds to a first diagonal zone and the second M-coding thread corresponds to a second diagonal zone.

In another aspect, a method for compressing video comprises dividing a picture vertically into N zones, deploying N+1 processes, wherein N processes are M-coding and one process is E-coding, processing the N M-coding processes in parallel utilizing a plurality of processing cores, processing the E-coding process utilizing an available processing core of the plurality of processing cores and synchronizing the N+1 processes. The N M-coding processes includes M-coding a current macroblock after M-coding a previous macroblock finishes. The E-coding process includes E-coding the current macroblock after M-coding the current macroblock finishes. Processing the E-coding process includes E-coding the current macroblock after E-coding the previous macroblock finishes. The method further comprises M-coding a current macroblock after M-coding a previous macroblock finishes, E-coding the current macroblock after M-coding the current macroblock finishes and E-coding the current macroblock after E-coding the previous macroblock finishes. The method further comprises M-coding a macroblock after E-coding of an upper-right macroblock finishes if the macroblock is not in a first macroblock row. The method further comprises M-coding a macroblock after E-coding of an upper macroblock finishes if the macroblock is a last macroblock in a macroblock row.

BRIEF DESCRIPTION OF THE DRAWINGS

FIGS. 1A-C illustrate block diagrams of embodiments of parallel processing apparatuses for video compression.

FIG. 3 illustrates an exemplary vertical split of a picture.

DETAILED DESCRIPTION OF THE PREFERRED EMBODIMENT

Figure 2:
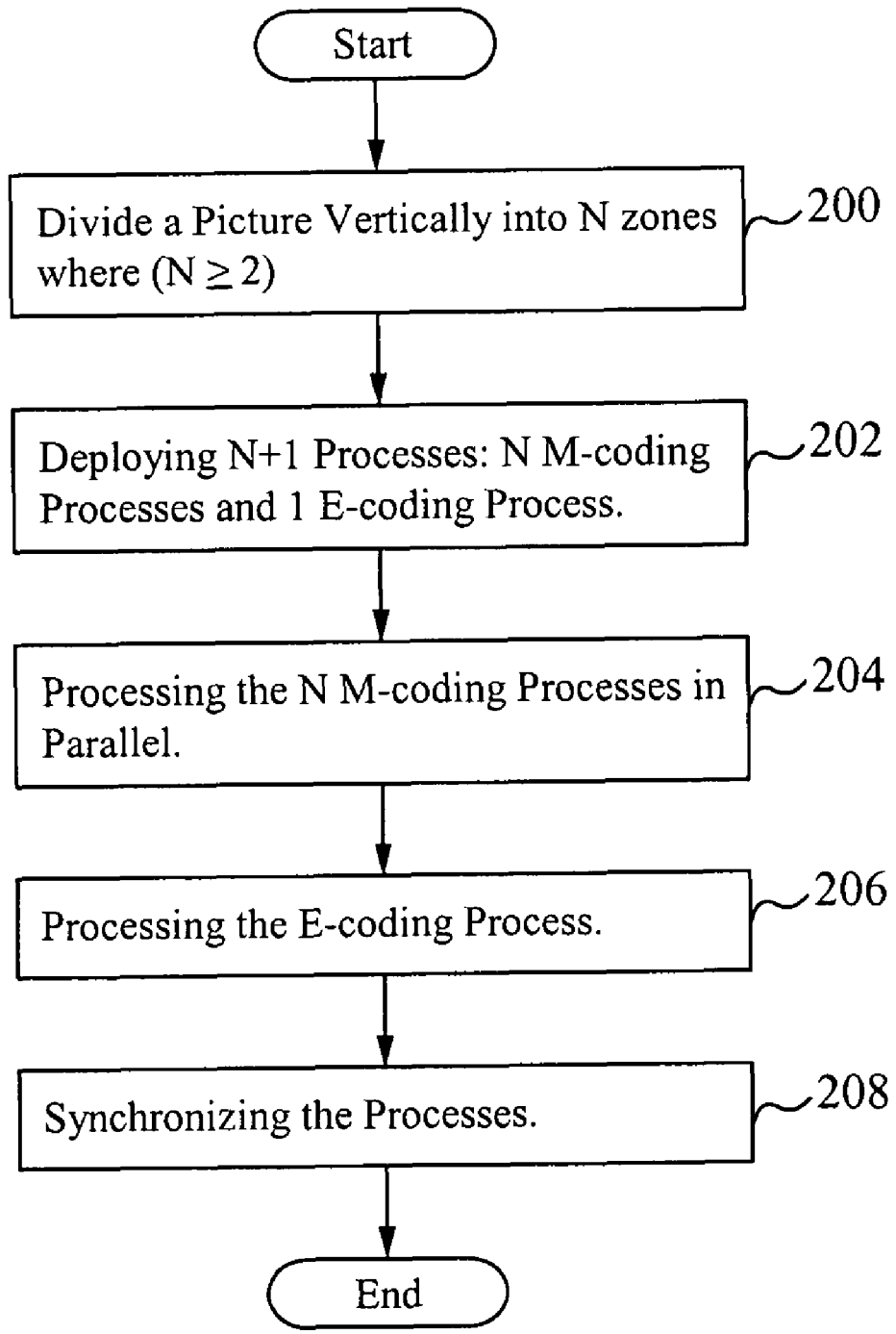
FIG. 2 illustrates a flow chart of a process of vertical split parallelism.

A video sequence includes a sequence of pictures. Each picture is further divided into multiple macroblocks. The traditional encoding process encodes the macroblocks one by one in raster scan order. In general, the encoding process of each macroblock includes a macroblock type selection, motion estimation and compensation front stage, a transform and quantization middle stage and an entropy encoding end stage.

Vertical Split Parallelism (VSP) divides the traditional video compression process into two portions: M-coding and E-coding. M-coding stands for a general macroblock coding process without the entropy encoding process. E-coding stands for the entropy coding process. A picture is divided vertically, where each vertically divided partial picture represents a zone. Thus, a picture includes multiple zones. Each zone is processed by M-coding first. The output of M-coding of each zone in macroblock units is further processed by E-coding. A feature of VSP is to decouple the dependence of M-coding and E-coding of each macroblock so that the E-coding of a macroblock is not processed immediately after the M-coding of itself. In addition, each macroblock does not depend on the finishing of E-coding of its previous macroblock in raster scan order.

In general, if a picture is divided into N zones vertically, VSP deploys N+1 processes: N M-coding processes for N zones and one E-coding process for entropy coding. For example, if a picture is divided into two zones vertically, VSP deploys three processes: two M-coding processes for the two zones and one E-coding process for entropy coding.

By dividing a macroblock encoding process into M-coding and E-coding processes, multiple M-coding threads and one E-coding thread are able to progress simultaneously with proper synchronization between threads. The M-coding includes mode decision, transformation and quantization. These M-coding stages are the heavy workload tasks compared to the entropy coding task of E-coding. Since the workload of the M-coding process is greater than E-coding for each macroblock coding process, a core is able to be designated to each M-coding process. For example, if there are two cores in the device or system, then two M-coding processes would be utilized where one process is sent to each core. Even though two M-coding processes are able to run in parallel, some AVC syntax dependency problems still exist such as delta-QP and macroblock (MB) skip run. These problems are able to be solved by the introduction of the standalone E-thread. Either one of the two cores is able to handle the E-coding process since the workload of E-coding is light. Therefore, VSP exploits parallel processing computing power efficiently.

VSP overcomes problems encountered when encoding multiple slices in a parallel processing way. VSP parallel processing of video compression produces the same result of sequential processing of a single slice. Therefore, it is easy to validate the correctness of VSP parallel processing by comparing the equivalence of results of VSP parallel processing and sequential processing of a single slice. Since the results of VSP parallel processing and sequential processing of a single slice are the same, the video quality is guaranteed to be the same. By dividing a picture vertically, each zone of VSP typically has equal complexity of video content. Therefore, the predefined individual workload of each core is relatively equal. In addition, the workload unbalance, if it exists, is eliminated by the entropy coding process of VSP. Therefore, the workload of VSP parallel processing is balanced automatically. The entropy coding process of VSP produces a single result which is the same as single slice encoding. Thus, there is no extra stage concatenation work of partial results of multi-slice parallel processing.

It is preferable to run video compression software with VSP realization on a Symmetric MultiProcessing (SMP) machine which is a multiprocessor computer architecture where two or more identical processors or cores are coupled to a single shared main memory because the synchronization of multiple processes (threads) is achieved by reading and writing of shared memory.

The implementation of VSP is able to be via software, hardware or a combination of software and hardware. The preferred method of splitting a picture is vertically; however, in alternate embodiments, the picture is split diagonally.

By increasing the amount of video compression processed in parallel and minimizing the sequential processing, the video compression performance is improved.

VSP supports Picture Rate Control, Macro-block Quantization Weight Macro-block Rate Control (MQW MBRC), Picture re-encode, MB re-encode, CAVLC and CABAC entropy coding, frame and field input format and deblocking on/off.

There are a number of issues that have been resolved by VSP. The SYNC boundary limitation has been resolved. The Quantizer Parameter (QP) boundary limitation is resolved by pre-calculating all QP before actual MB coding or by changing the algorithm which removes the dependency of the leftmost MB on rightmost MB. The QP delta dependency problem is resolved by a two stage algorithm. The QP delta dependency problem existed because there was a dependency on previous QP in raster scan order and on previous SKIP MB in raster scan order. With VSP, the coding is separated in two stages, where M-coding is run in parallel and E-coding is run in raster-scan order sequentially. Thus, there is significant speedup in a dual core system.

The method of parallelization is able to be categorized by task or data decomposition. Within Task Decomposition, at the Functional Level, JvtEncoder is able to be decomposed into processes in a pipeline fashion. Each process is executed as an independent function and the output is able to be the input for the next process. Parallelization is able to be achieved if load balance and data dependence are resolved in each process. Current code computation loading for each process is unbalanced. JvtCodingProcess is the heaviest function compared to others.

Within Data Decomposition, at the Frame-Level, each picture is able to be decomposed into two halves for encoding simultaneously in a different time frame. PaleMoonA algorithm realizes this method. At the Slice-Level, each picture is encoded with multiple different slices to achieve parallelism. Processed within one picture, no reference frames issue in the time domain. At the MB-level, each MB is the processing unit for parallelization. Data synchronization is a key issue to handle since data dependence on neighboring MBs is standard in an AVC encoder. VSP adopts this method. At the Block-Level, parallelization is able to be done within an MB. It is a very low level algorithm to avoid the data synchronization issue that happens in the MB-Level. Within Mixed Decomposition, both task and data decomposition are included.

FIGS. 1A-C illustrate block diagrams of embodiments of parallel processing apparatus for video compression. In each of the FIGS. 1A-C, a computing device contains one or more processors with one or more cores. Any combination of processors and cores is possible as long as there are at least two cores total.

FIG. 1A illustrates a computing device 1 with two processors, a first processor 2 and a second processor 4, each with a single core 3, 5 respectively. FIG. 1B illustrates a computing device 1' with a single processor 2' containing a dual core 3'. FIG. 1C illustrates a computing device 1'' with two processors, a first processor 2' and a second processor 4', each containing a dual core 3', 5' respectively. Each computing device has at least two cores, either within the same processor or multiple processors. Furthermore, as shown in FIG. 1C, more than two cores are able to be utilized. Any number of processors and cores are able to be used as long as the total number of cores is more than two. The computing device is any digital device including, but not limited to, a camcorder, a digital camera, a cellular phone, a Personal Digital Assistant (PDA) or a computer.

Utilizing a plurality of cores, the parallel processing apparatus for video compression is able to expedite the video compression process by taking advantage of parallel processing. As described herein, after a picture is divided vertically into N zones, N+1 processes are deployed: N M-coding processes and one E-coding process for entropy coding. Since the M-coding processes are heavier workloads than the E-coding process, a core is able to be designated for each M-coding process. For example, referring to FIG. 1A, a first M-coding process is sent to the core 3 within the first processor 2, and a second M-coding process is sent to the core 5 within the second processor 4, so that each M-coding process is processed separately. Then, either of the cores 3 or 5, are able to be utilized for the E-coding process since the processing for that process is relatively light. Therefore, the parallel processing apparatus for video compression exploits parallel processing computing power efficiently.

FIG. 2 illustrates a flow chart of an embodiment of Vertical Split Parallelism (VSP). In the step 200, a picture is divided into N zones where N is greater than or equal to two. Generally, the picture is divided so that the number of zones equals the number of cores available for processing. In the step 202, N+1 processes are deployed. There are N M-coding processes and one E-coding Process. In the step 204, the N M-coding processes are processed in parallel. Then in the step 206, the E-coding processes are processed utilizing any of the cores that are available. Then, in the step 208, the processes are synchronized.

FIG. 3 illustrates a vertical split of a picture with 128×96 pixels (8×6 MBs) to two zones: zone_a (left part) and zone_b (right part). Each vertical zone, here zone_a and zone_b, is processed as an individual thread by a separate core. For MB level encoding, only zone boundaries between vertical zones need major synchronization. Another independent thread is utilized for the entropy coding. Each MB is encoded by an "M-coding", macroblock layer coding, and an "E-coding", entropy coding. Each zone is processed by one thread for M-coding. For example, zone_a is M-coded by one thread, and Zone_b is M-coded by another thread. An independent thread performs the "E-coding." So if the picture is split into two vertical zones, then there are three threads running in total.

There are a number of synchronization rules or requirements to ensure coding is performed efficiently. M-coding a current macroblock starts when M-coding a previous macroblock is finished. For example, referring to FIG. 3, MB 1a is able to start only when MB 0a is finished. Then, MB 2b is only able to start when MB 1b is finished, and MB 1b has to wait until MB 0a finishes before it is able to start. E-coding of an MB is able to start only when M-coding of its own MB is finished. E-coding of an MB is also only able to start when E-coding of its previous MB is finished.

In addition to the above general synchronization, there are rules which depend on the design of the data structure used because there is a close relationship between the design of a duplicated data structure and the synchronization algorithm. The following describes the implementation of the synchronization algorithm which depends on the design of the duplicated data structure. For each column of macroblocks, there are two sets of data. For example, for an 8 pixel×6 pixel MB picture, there are 8×2 sets of data: 16 sets of Adjacent Macroblock Information (AdjacentMbInfo), Previous CABAC Information for Arithmetic Coding (PrevCabacInfoSet), Macro-block Encoding (MbCoding), Macro-block Encoding, Authoring Encoding Mode (MbCodingAE) and Macroblock Encoding Mode Decision (ModeDecision). For each column of macroblocks, there are two sets of entropy function call recording buffers. Each MB buffer is able to record up to 32 function calls. For example, for an 8 pixel×6 pixel MB picture, VspSims[8×2][32] is the entropy function call recording buffer. For an MB which is not in the first MB row, M-coding is able to start only when the E-coding of its upper-right MB is finished. If the MB is the last MB in an MB row, M-coding is able to start only when the E-coding of its upper MB is done. For example, referring to FIG. 3, M-coding of MB e10 is able to start only when E-coding of MB e03 is finished. Then, MB e10 re-uses the same set of data as MB e02, since MB e10 and MB e02 are in the same MB column.

Figure 4A:
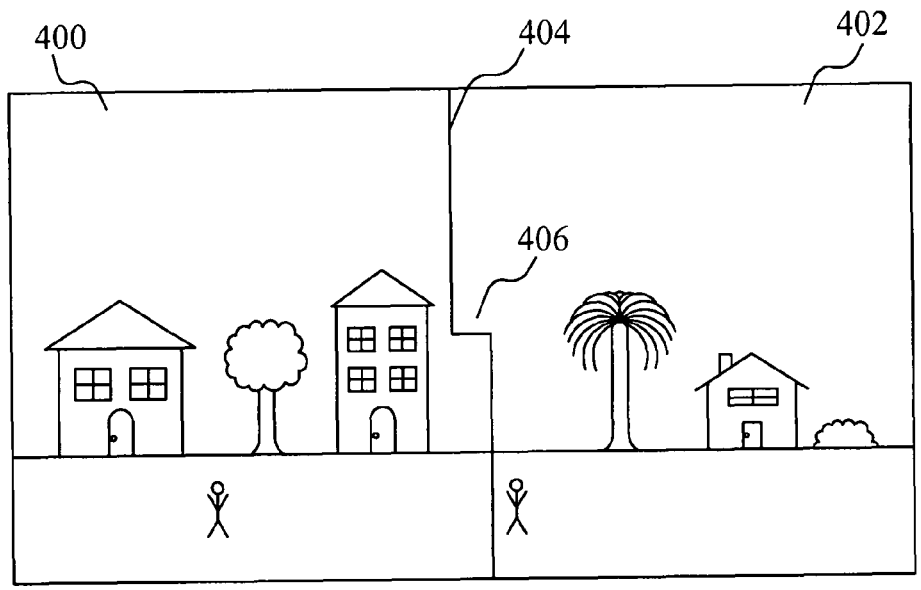
FIG. 4A illustrates a graphical representation of shift splitting.
Figure 4B:
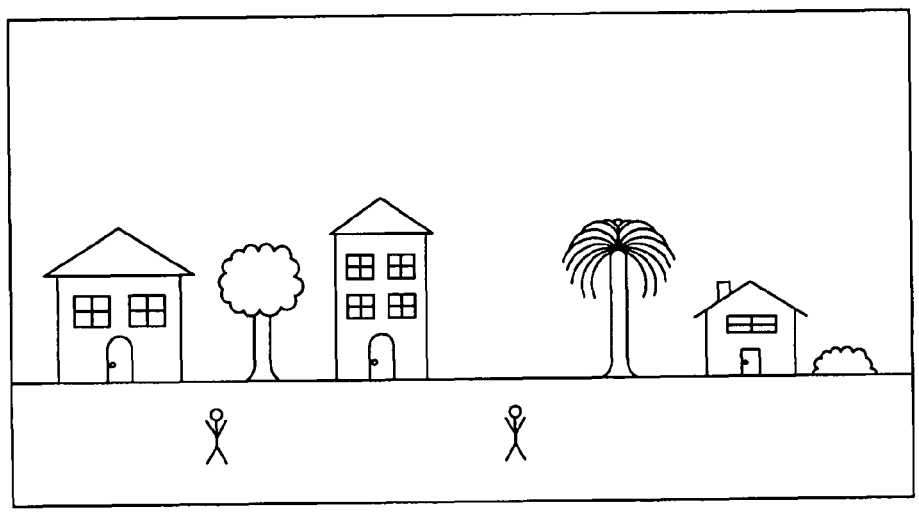
FIG. 4B illustrates a picture to be compressed.

Another improvement by the parallel processing apparatus for video compression involves the use of vertical zones instead of horizontal zones. Vertical zones have other benefits over horizontal zones in addition to those described above. In general, there are less pixels vertically than there are horizontally, so if the number of columns or rows is not even, the disparity is smaller vertically than horizontally. Thus, one processor would not have a significantly larger workload than the other. Another benefit of vertical zoning is that it is possible to do a shift-split vertically when the number of columns are uneven as shown in FIG. 4A. Shift-splitting is where the vertical split is modified at a point in the picture so that the zones are of equal size. Referring to FIG. 4A, for example, when generating two zones, a first zone 400 and a second zone 402, where there is an odd number of columns, a split 404 is shifted over by one column at a midpoint 406 down the picture, which causes the two zones to be of equal size. Yet another benefit of vertical zoning is that for many images, there are static components in the image such as a blue sky across the top of the image or water on the bottom of the image. For example, an image contains a blue sky across the top with houses, trees and people in the lower part of the image, similar to the one shown in FIG. 4B. If the image is split horizontally, processing a blue sky requires little processing power for compression since it is relatively static whereas the section with the houses, trees and people requires much more processing and thus the balance would be uneven. However, if the image were split vertically, both sides would have half of the sky and half of the houses, trees and people providing a much better balanced processing scheme.

Utilizing VSP provides a number of benefits over other implementations of compression. With respect to load balance, there is almost an equal number of MBs for each heavy workload thread. All MBs are processed within the same frame. Partitioning vertically achieves a balanced load. In terms of scalability, it is easy to adjust the number of threads. Regarding synchronization, the number of items needed to be synchronized is minimized. Only the first column MB in a zone next to a zone boundary needs major synchronization. A data-dependency map is able to be used for synchronization. The possibility of "OkToGo" result of synchronization is high, while the latency of "NotOkToGo" to "OkToGo" of synchronization is short. Most reference MBs are in the same local cache. x86 dual core processors have two L2 caches. CELL has local store for each SPE. The Ref MB across the boundary does not need to be transferred. x86 uses pre-fetch to transfer Ref MB. CELL uses DMA for transfers. Each heavy workload thread processes only part of the frames. Each vertical region is done by each heavy workload thread.

If there is any workload unbalance between heavy workload threads (M-coding) on a multi-core machine, the independent light workload threads (E-coding) are able to fill in the gaps. Therefore, the multi-core workload is balanced automatically. With the implementation described herein, processor usage is above 90% on dual core machines most of the time. VSP slightly increases memory usage by roughly 2.3%.

Figure 5:
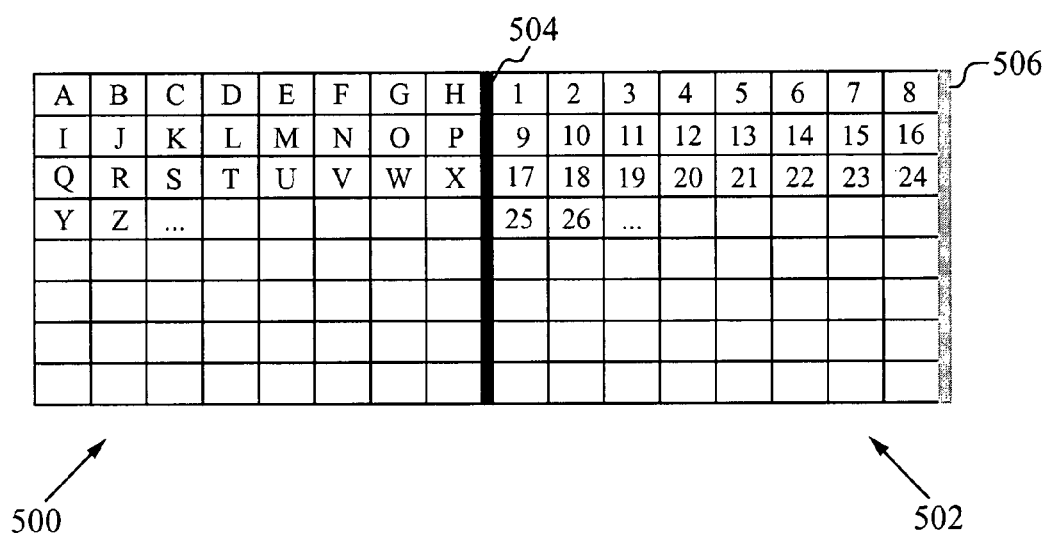
FIG. 5 illustrates a graphical representation of threads with two types of boundaries.

A rate control algorithm is able to resolve the QP dependency issue for the general rate control algorithm beyond the MQW MBRC algorithm. A first thread 500 and a second thread 502 are shown with two types of boundaries in FIG. 5. A SYNC boundary 504 is due to the Intra Prediction requirement. MB[1] depends on MB[H] (e.g. MB[1] is not able to start until MB[H] is finished). MB[P] depends on MB[1] (e.g. MB[P] is not able to start until MB[1] finished). A QP Boundary 506 is due to the Rate Control Algorithm. MB[I] depends on MB[8] (e.g. QP of MB[I] is decided after QP of MB[8] is decided). MB[Q] depends on MB[16] (e.g. QP of MB[Q] is decided after QP of MB[16] is decided).

The algorithm change, which removes the QP boundary issue, decides QP of the leftmost MB without dependency on the rightmost MB, and the rest of the QP dependencies between MBs (e.g. all other dependencies of MB on the previous MB in raster scan order except dependency of leftmost MB on the rightmost MB) are not affected (e.g. change QP for each MB during MB coding). Therefore, VSP is able to overcome the weak point of dependency between MBs. QP of MB[9] is able to either depend on QP of MB[8] or depend on QP of MB[P]. The New Rate Control algorithm treats the picture split as two pictures (left half picture and right half picture for QP dependency in two raster scan orders). There are no correlations between the leftmost MB and the rightmost MB, and the QP boundary dependency is able to be removed.

In operation, the parallel processing apparatus for video compression utilizes the power of parallel processing using multiple cores to expedite video compression. Since many devices and systems include multiple cores, either in one processor or multiple processors, for efficiency purposes, it is essential that video compression utilize the multiple cores. Other attempts have been made at utilizing multiple cores, but they have inherent drawbacks that reduce their efficiency. VSP separates each picture into N vertical zones, where the zones are generally the same size. An M-coding process is generated for each zone in addition to one E-coding process. Since each M-coding process has similar complexity, each core will take approximately the same amount of time to process them. Additionally, the E-coding process is much less of a workload, so it is able to be processed by any available core. Then, the processes are synchronized.

As described, a device utilizes vertical split parallelism by separating pictures into vertical zones and then sends each corresponding process to a separate core to be processed. Additionally, an entropy coding process is sent to an available core. Thereafter, the processes are synchronized, and rapidly compressed video is achieved. The implementation of the vertical split parallelism is able to be in hardware, software or a combination of both.

Vertical split parallelism is able to be used in many applications, including but not limited to video editing, storage, broadcasting and communication.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An apparatus for compressing video comprising:
   a. a first processing core for processing a first macroblock layer coding (M-coding) thread; and
   b. a second processing core coupled to the first processing core for processing a second M-coding thread,
   wherein an entropy coding (E-coding) thread is processed by an available processing core selected from the first processing core and the second processing core, wherein the E-coding thread is based on an output of the first M-coding thread and the second M-coding thread.

2. The apparatus as claimed in claim 1 wherein the first and second M-coding threads include mode decision, transformation and quantization and the E-coding thread includes entropy coding.

3. The apparatus as claimed in claim 1 wherein the available processing core is selected automatically.

4. The apparatus as claimed in claim 1 wherein the first M-coding thread and the second M-coding thread are processed in parallel.

5. The apparatus as claimed in claim 4 wherein the first M-coding thread and the second M-coding thread are processed simultaneously.

6. The apparatus as claimed in claim 1 wherein the first M-coding thread corresponds to a first vertical zone and the second M-coding thread corresponds to a second vertical zone.

7. The apparatus as claimed in claim 1 wherein the first M-coding thread corresponds to a first split-shifted vertical zone and the second M-coding thread corresponds to a second split-shifted vertical zone.

8. The apparatus as claimed in claim 1 wherein the first M-coding thread corresponds to a first diagonal zone and the second M-coding thread corresponds to a second diagonal zone.

9. A method for compressing video comprising:
   a. dividing a picture vertically into N zones, wherein N is greater than or equal to two;
   b. deploying N+1 processes, wherein N processes are macroblock layer coding (M-coding) and one process is entropy coding (E-coding);
   c. processing the N M-coding processes in parallel utilizing a plurality of processing cores;
   d. processing the E-coding process to process an output of the M-coding processes utilizing an available processing core of the plurality of processing cores; and
   e. synchronizing the N+1 processes.

10. The method as claimed in claim 9 wherein processing the N M-coding processes includes M-coding a current macroblock after M-coding a previous macroblock finishes.

11. The method as claimed in claim 9 wherein processing the E-coding process includes E-coding the current macroblock after M-coding the current macroblock finishes.

12. The method as claimed in claim 9 wherein processing the E-coding process includes E-coding the current macroblock after E-coding the previous macroblock finishes.

13. The method as claimed in claim 9 further comprising:
   a. M-coding a current macroblock after M-coding a previous macroblock finishes;
   b. E-coding the current macroblock after M-coding the current macroblock finishes; and
   c. E-coding the current macroblock after E-coding the previous macroblock finishes.

14. The method as claimed in claim 9 further comprising M-coding a macroblock after E-coding of an upper-right macroblock finishes if the macroblock is not in a first macroblock row.

15. The method as claimed in claim 9 further comprising M-coding a macroblock after E-coding of an upper macroblock finishes if the macroblock is a last macroblock in a macroblock row.

* * * * *

UNITED STATES PATENT AND TRADEMARK OFFICE
CERTIFICATE OF CORRECTION

PATENT NO. : 8,000,388 B2
APPLICATION NO. : 11/716197
DATED : August 16, 2011
INVENTOR(S) : Jonathan JiannJang Huang et al.

It is certified that error appears in the above-identified patent and that said Letters Patent is hereby corrected as shown below:

At the title page, please add the following paragraph:

Related U.S. Application Data

Provisional application No. 60/831,614, filed on Jul. 17, 2006.

Signed and Sealed this
Eighteenth Day of October, 2011

David J. Kappos
*Director of the United States Patent and Trademark Office*